United States Patent
Ellis et al.

(10) Patent No.: US 11,340,623 B2
(45) Date of Patent: May 24, 2022

(54) DRIVER-CENTRIC MODEL PREDICTIVE CONTROLLER

(71) Applicant: TOYOTA RESEARCH INSTITUTE, INC., Los Altos, CA (US)

(72) Inventors: Logan Michael Ellis, Pleasanton, CA (US); Huihua Zhao, San Jose, CA (US); Avinash Balachandran, Sunnyvale, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 246 days.

(21) Appl. No.: 16/373,527

(22) Filed: Apr. 2, 2019

(65) Prior Publication Data
US 2020/0218272 A1 Jul. 9, 2020

Related U.S. Application Data

(60) Provisional application No. 62/788,469, filed on Jan. 4, 2019.

(51) Int. Cl.
*G05D 1/02* (2020.01)
*G05D 1/00* (2006.01)

(52) U.S. Cl.
CPC ......... *G05D 1/0221* (2013.01); *G05D 1/0088* (2013.01); *G05D 1/0223* (2013.01); *G05D 2201/0213* (2013.01)

(58) Field of Classification Search
CPC .. G05D 1/0221; G05D 1/0088; G05D 1/0223; G05D 2201/0213
See application file for complete search history.

(56) References Cited

U.S. PATENT DOCUMENTS

| | | | |
|---|---|---|---|
| 7,400,963 B2 * | 7/2008 | Lee ................... | B60K 31/0083 701/93 |
| 8,744,648 B2 | 6/2014 | Anderson et al. | |
| 9,469,296 B2 | 10/2016 | Nilsson et al. | |
| 9,669,828 B2 | 6/2017 | Caveney et al. | |
| 2011/0190972 A1 * | 8/2011 | Timmons ............... | G08G 1/166 701/31.4 |
| 2013/0253815 A1 * | 9/2013 | Orfila ................ | B60W 30/0956 701/301 |
| 2014/0244119 A1 * | 8/2014 | McGrogan ............ | B60K 6/445 701/54 |
| 2015/0012204 A1 * | 1/2015 | Breuer ................ | B60R 21/0134 701/96 |

FOREIGN PATENT DOCUMENTS

CN 103035121 A * 4/2013

OTHER PUBLICATIONS

English translation of CN-103035121-A.*
(Continued)

*Primary Examiner* — Rami Khatib
*Assistant Examiner* — Shahira Baajour
(74) *Attorney, Agent, or Firm* — Seyfarth Shaw LLP

(57) ABSTRACT

A method for controlling a vehicle based on a driver-centric model is presented. The method includes generating a trajectory for the vehicle and receiving an input from a driver. The method also includes generating a velocity profile and an acceleration profile based on a combination of the trajectory and the input. The method further includes controlling the vehicle based on the velocity profile and the acceleration profile.

20 Claims, 5 Drawing Sheets

(56) References Cited

OTHER PUBLICATIONS

Berntorp, et al., "Hierarchical Predictive Control for Ground-Vehicle Maneuvering," American Control Conference, Jul. 1-3, 2015, pp. 2771-2776, Chicago, IL, USA.

Jalalmaab, et al., "Cooperative Road Condition Estimation for an Adaptive Model Predictive Collision Avoidance Control Strategy," IEEE Intelligent Vehicles Symposium, Jun. 19-22, 2016, pp. 1072-1077, Gothenburg, Sweden.

* cited by examiner

DRIVER-CENTRIC MODEL PREDICTIVE CONTROLLER

CROSS-REFERENCE TO RELATED APPLICATION

The present application claims the benefit of U.S. Provisional Patent Application No. 62/788,469, filed on Jan. 4, 2019, and titled "LONGITUDINAL SPEED MODEL PREDICTIVE CONTROLLER," the disclosure of which is expressly incorporated by reference herein in its entirety.

BACKGROUND

Field

Certain aspects of the present disclosure generally relate to autonomous intervention systems and more particularly, to a system and method for blending a driver-centric model with an autonomous intervention system.

Background

Semi-autonomous agents, such as semi-autonomous vehicles, may operate in various modes. For example, a semi-autonomous agent may operate in a fully autonomous mode (e.g., without human interaction). As another example, the semi-autonomous agent may operate a guardian mode, where the agent is controlled by a human and an autonomous system may override the human's commands when necessary (e.g., prevent a collision). The guardian mode may be referred to as an autonomous intervention mode. It is desirable to improve vehicle control systems to provide a driver-first control strategy while maintaining safety via autonomous intervention.

SUMMARY

In one aspect of the present disclosure, a method for controlling a vehicle based on a driver-centric model is disclosed. The method includes generating a trajectory for the vehicle. The method also includes receiving an input from a driver. The method further includes generating a velocity profile and an acceleration profile based on a combination of the trajectory and the input. The method still further includes controlling the vehicle based on the velocity profile and the acceleration profile.

In another aspect of the present disclosure, a non-transitory computer-readable medium with non-transitory program code recorded thereon is disclosed. The program code is for controlling a vehicle based on a driver-centric model. The program code is executed by a processor and includes program code to generate a trajectory for the vehicle. The program code also includes program code to receive an input from a driver. The program code further includes program code to generate a velocity profile and an acceleration profile based on a combination of the trajectory and the input. The program code still further includes program code to control the vehicle based on the velocity profile and the acceleration profile.

Another aspect of the present disclosure is directed to an apparatus for controlling a vehicle based on a driver-centric model. The apparatus having a memory and one or more processors coupled to the memory. The processor(s) is configured to generate a trajectory for the vehicle. The processor(s) is also configured to receive an input from a driver. The processor(s) is further configured to generate a velocity profile and an acceleration profile based on a combination of the trajectory and the input. The processor(s) still further configured to control the vehicle based on the velocity profile and the acceleration profile.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
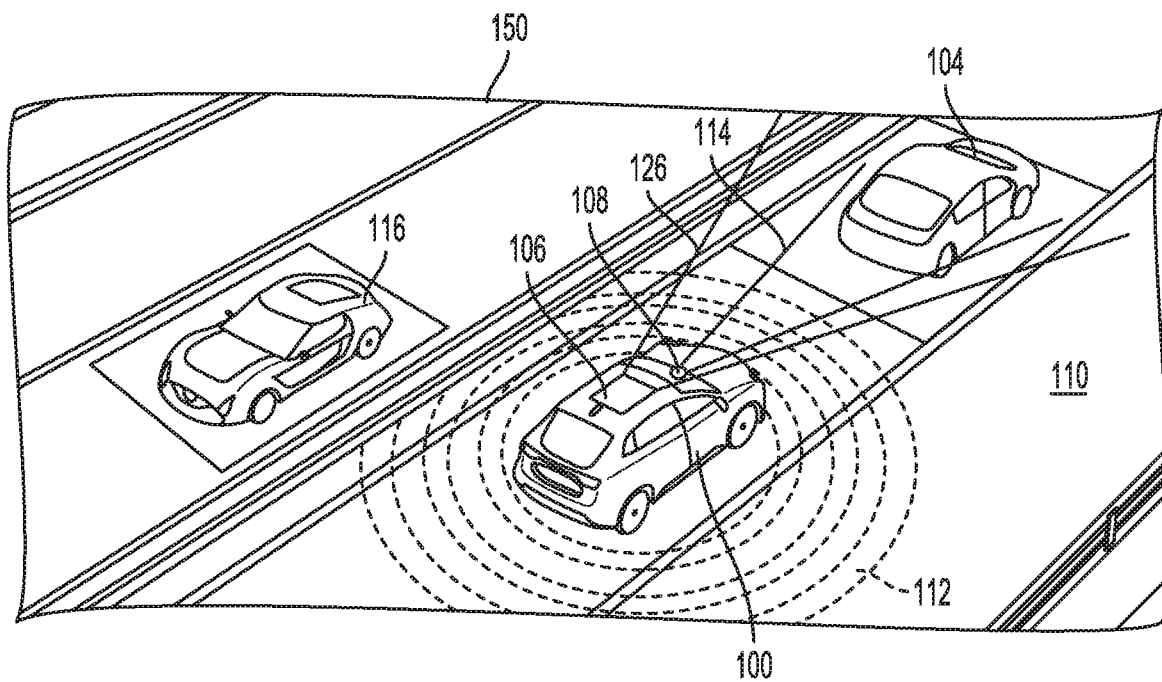
FIG. 1 illustrates an example of a vehicle in an environment according to aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Autonomous agents (e.g., vehicles, robots, drones, etc.) may operate without human interaction. For example, an autonomous vehicle may drive a passenger from a pick-up location to a drop-off location without human control. Although autonomous vehicles improve safety and convenience, some humans may still prefer to drive their own vehicle. Semi-autonomous vehicles provide a solution for improving safety while allowing a human to provide commands for controlling the vehicle. As discussed, the semi-autonomous vehicle may operate in various modes. For example, a semi-autonomous vehicle may operate in the autonomous mode (e.g., without human interaction). As another example, the semi-autonomous vehicle may operate in the autonomous intervention mode (e.g., guardian mode).

In the autonomous intervention mode, a human operates the vehicle and a vehicle control system monitors the human's commands as well as the surrounding environment. For example, the vehicle control system monitors actions of other objects, such as vehicles and pedestrians, in an environment surrounding the vehicle. The vehicle control system may override a human's commands when an imminent danger (e.g., potential collision) is detected. It is desirable to improve vehicle control systems to provide a driver-first control strategy while maintaining safety via autonomous intervention.

For simplicity, the present disclosure discusses a vehicle control system. The vehicle control system is not limited to a car (e.g., vehicle). The vehicle control system may also be used for other types of agents, such as robots, drones, planes, etc.

Aspects of the present disclosure are directed to a vehicle control system for a semi-autonomous vehicle. The semi-autonomous vehicle may be referred to as a vehicle. The vehicle control system may be a longitudinal controller (e.g., speed controller). In one configuration, the vehicle control system uses a planner to plan a trajectory (e.g., a desired acceleration and velocity) along a route. Additionally, the driver may provide acceleration adjustments while the vehicle is traveling on the route. The driver's acceleration adjustments may increase or decrease the vehicle's velocity. The driver's acceleration adjustments are determined via inputs received at an accelerator and a brake.

The acceleration adjustments commanded by the driver may be referred to as a driver intent, a driver commanded acceleration, or a driver acceleration. The acceleration and velocity determined by the planner may be referred to as the planned acceleration and velocity or the planned trajectory. The vehicle control system balances the driver's intent with the planned acceleration and velocity.

In one configuration, the vehicle control system favor's the driver's intent so long as the intent is within safety boundaries set by the planner. The safety boundaries may include a maximum velocity, a minimum velocity, a maximum acceleration, and a maximum deceleration. If the driver's intent falls outside one of the safety boundaries, the vehicle control system favors the planned trajectory over the driver's intent. That is, the vehicle control system may blend the driver's intent with the planned trajectory to adjust to the driver's intent to fall within the safety boundaries.

As an example, when a driver intends to stop the vehicle, the driver releases the accelerator and provides input via the brake. The vehicle control system may not intervene if the deceleration falls within the safety boundary. In one example, the brake input may be less than a threshold, causing the deceleration rate to be less than a maximum deceleration. A deceleration rate that is less than the maximum deceleration may prevent a collision with a rear vehicle. Therefore, the vehicle control system may not intervene in the braking process of the current example.

As another example, the brake input may be greater than a threshold, causing the deceleration rate to be greater than the maximum deceleration. A deceleration rate that is greater than the maximum deceleration may be unsafe because the rear vehicle may not have time to react and may collide with the current vehicle. As such, the vehicle control system may intervene and adjust the deceleration rate to be less than the maximum deceleration to prevent a collision with the rear vehicle.

FIG. 1 illustrates an example of a vehicle 100 (e.g., ego vehicle) in an environment 150 according to aspects of the present disclosure. In the present example, the vehicle 100 is an autonomous vehicle. As shown in FIG. 1, the vehicle 100 may be traveling on a road 110. A first vehicle 104 may be ahead of the vehicle 100 and a second vehicle 116 may be adjacent to the ego vehicle 100. In this example, the vehicle 100 may include a 2D camera 108, such as a 2D RGB camera, and a LIDAR sensor 106. Other sensors, such as RADAR and/or ultrasound, are also contemplated. Additionally, or alternatively, the vehicle 100 may include one or more additional 2D cameras and/or LIDAR sensors. For example, the additional sensors may be side facing and/or rear facing sensors.

In one configuration, the 2D camera 108 captures a 2D image 220 that includes objects in the 2D camera's 108 field of view 114. The LIDAR sensor 106 may generate one or more output streams. The first output stream may include a 3D cloud point of objects in a first field of view, such as a 360° field of view 112 (e.g., bird's eye view). The second output stream 124 may include a 3D cloud point of objects in a second field of view, such as a forward facing field of view.

The 2D image captured by the 2D camera includes a 2D image of the first vehicle 104, as the first vehicle 104 is in the 2D camera's 108 field of view 114. As is known to those of skill in the art, a LIDAR sensor 106 uses laser light to sense the shape, size, and position of objects in an environment. The LIDAR sensor 106 may vertically and horizontally scan the environment. In the current example, the artificial neural network (e.g., autonomous driving system) of the vehicle 100 may extract height and/or depth features from the first output stream. The autonomous driving system of the vehicle 100 may also extract height and/or depth features from the second output stream.

The information obtained from the sensors 106, 108 may be used to determine a planned trajectory for the vehicle 100. The planned trajectory may consider local laws (e.g., speed limit), road conditions, vehicle resources (e.g., fuel, battery power, etc.), safety rules, other vehicles within a vicinity of the vehicle 100, and other factors. The planned trajectory includes an acceleration and velocity. The planned trajectory may also include a navigation path (e.g., route).

Conventional vehicle control systems (e.g., feedback control systems), such as proportional-derivative control, cannot blend the driver intent and the planned trajectory. Therefore, there is a need to improve the conventional vehicle control systems. In one configuration, the vehicle control system uses a receding horizon control approach that blends the driver intent and the planned trajectory to generate a vehicle command output. The vehicle command output may also be referred to as a control output or a command output. The discrete receding-horizon control approach may use model predictive control (MPC). By using MPC, constraints may be applied to the command output to maintain vehicle and passenger safety.

In one configuration, the vehicle control system uses a quadratic cost function and linear constraints that minimize a quadratic error between a driver intent and the planned trajectory (e.g., predefined velocity profile) to generate a blended output. Specifically, the quadratic cost function minimizes two separate error terms. A first error term is an error between a current vehicle velocity and a planned velocity. A second error term is an error between a current vehicle acceleration and a driver acceleration. Parameters of the planned trajectory may be adjusted to accelerate or decelerate the vehicle in response to detected danger, regardless of the driver's intent.

The planner may plan the trajectory for a horizon, such as five to ten seconds, from a current time step. The inputs to the vehicle control system may include one or more planned velocities ($v^d$) from the planner, where $v^d \in R^N$, for the horizon. A planned velocity may also be referred to as a planned velocity profile. The planned velocity is pre-determined by the planner for the horizon with interval lengths ($\Delta_t$) between time steps (t), where $\Delta_t \in R^{N-1}$. The planned velocities may be represented as a vector. R refers to real numbers and N is a number of planned velocity (e.g., speed) inputs. N may be based on a number of time steps in a horizon.

For example, the planned velocities ($v^d$) for the horizon may be zero miles per hour (MPH), ten MPH, and twenty MPH. The vehicle control system determines interval lengths between the different planned velocities. In this example, given a horizon of five seconds, the planned trajectory includes planned velocities from zero to ten MPH for two second, where two seconds is an interval length. The planned trajectory also includes planned velocities from ten to twenty MPH for three seconds. Accordingly, the interval lengths ($\Delta_t$) may be a duration of time between different desired velocities. Specifically, each time step may correspond to a specific velocity. The interval lengths ($\Delta_t$) refers to the duration of the time step.

The planner may also define a maximum allowable velocity ($v^{max}$) and a minimum allowable velocity ($v^{min}$), where $v^{min} \in R^N$ and $v^{max} \in R^N$, for the horizon. Specifically, the maximum allowable velocity ($v^{max}$) and a minimum allowable velocity ($v^{min}$) correspond to the nominal velocity at a given timestep. The maximum allowable velocity is a maximum velocity for the vehicle to safely navigate the current environment during the specific timestep and the minimum allowable velocity is a minimum velocity for the vehicle to safely navigate the current environment during the specific timestep. The maximum allowable velocity and a minimum allowable velocity may vary over the course of the horizon. The maximum allowable velocity and a minimum allowable velocity may be represented as vectors having a same length as the vector for the desired velocities.

The input also includes the vehicle's initial velocity ($v^{init}$), as determined from a localization system, where $v^{init} \in R$. The vehicle's initial velocity is the vehicle's true velocity at a given time step. That is, the vehicle's initial velocity ($v^{init}$) may be determined upon starting the vehicle and any time during operation. In one configuration, the vehicle's initial velocity is determined at a pre-determined interval, such as every 20 ms.

The input includes a vector of driver accelerations ($a^{dr}$) of a finite-horizon starting from an initial time step, where $a^{dr} \in R^M$, where M is a number of driver acceleration/deceleration inputs. M may be based on a number of time steps in a horizon. The driver controls the vehicle's velocity via an initial acceleration or deceleration input. After obtaining the initial input, the remaining terms of the vector of driver accelerations ($a^{dr}$) are estimated via a signal reconstruction method, such as a zero-order hold or other methods. The vector of driver accelerations includes both acceleration and deceleration inputs.

Outputs of the vehicle control system may include predicted velocities ($v^{LC}$) and an predicted accelerations ($a^{LC}$), where $V^{LC} \in R^N$ and $a^{LC} \in R^{N-1}$. The predicted velocities and accelerations are a result of blending the driver intent and planned trajectory. The output may also include a commanded acceleration profile ($a^{cmd}$), where $a_{cmd} \in R^{N-1}$.

The predicted accelerations ($a^{LC}$) correspond to a vector of accelerations, where each acceleration is used to reach the resultant velocity, at each time step. Due to drag, road conditions, vehicle weight, and other factors, the vehicle may not reach a predicted velocity using the predicted acceleration. The commended acceleration considers the discussed factors and is the acceleration needed to obtain the predicted acceleration.

The vehicle control system uses various parameters. These may be user-defined and may be fixed. In one configuration, the user-defined parameters include as a maximum allowable deceleration ($a^{min}$) and a maximum allowable acceleration ($a^{max}$), where $a^{min}$ is less than zero and $a^{max}$ is greater than zero. A vehicle's acceleration cannot be greater than the maximum allowable acceleration. Likewise, the vehicle's deceleration cannot be greater than the maximum allowable deceleration.

In one configuration, the parameters are dynamic. For example, acceleration limits may be contextual. The context may be provided via the speed limits provided to the controller. The controller parameters may represent fixed limits.

The parameters still further include a maximum allowable jerk ($j^{max}$) where the jerk is a rate of acceleration change between time steps. The maximum allowable jerk is a value that is greater than zero. The comfort level of vehicle occupants may be affected by the maximum allowable jerk. For example, a sudden acceleration or deceleration may thrust the vehicle's occupants forward or backward in their seat. The maximum allowable jerk may be used to mitigate sudden acceleration or deceleration, thereby improving an occupant's comfort.

Finally, the parameters include weighting scalars for the acceleration ($\psi^{acc}$) and velocity ($\psi^{vel}$) portions of the cost function. The weighting scalar for the acceleration and velocity are values that are greater than zero. The vehicle control system prioritizes the driver intent or the planned trajectory based on the weighting scalars. The weighting scalars may be user defined or pre-set by a manufacturer.

Aspects of the present disclosure identify a cost function to minimize an error between the vehicle's predicted velocity and a planned velocity $\|v^{LC} - v^d\|_2^2$. The cost function also minimizes an error between the vehicle's predicted acceleration and the driver acceleration $\|a^{LC} - a^{dr}\|_2^2$. The quadratic problem has the following form $$\arg \operatorname*{argmin}_{x} x^T Q x + c^T x, \text{ subject to: } Ax \leq b. \quad (1)$$

In EQUATION 1, A and b hey define the constraints of the system. For example, b may be a vector of maximum velocities, and A may be an identity (e.g., leave x unmodified). In another example, b may be min/max accelerations, and A is a function for converting the velocities in x to accelerations $$\left(\text{e.g., } \frac{x^1 - x^0}{\Delta_t}\right).$$

The variable vector x is determined as follows:

$$x \begin{bmatrix} (v^{LC} - v^d) \\ (a^{cmb} - a^{dr}) \end{bmatrix} = \begin{bmatrix} x^v_{0:N} \\ x^a_{0:M} \end{bmatrix}. \quad (2)$$

The cost matrix is as follows:

$$Q = \begin{bmatrix} I_N \cdot \psi^{vel} & 0_{N \times M} \\ 0_{M \times N} & I_M \cdot \psi^{acc} \end{bmatrix}, \quad (3)$$

where $I_N$ is an identity matrix having a dimension of N (e.g., number of planned velocity inputs), $I_M$ is an identity matrix having a dimension of M (e.g., number of driver accelerations), $0_{M \times N}$ and $0_{N \times M}$ are zero matrices with M×N and N×M dimensions.

Aspects of the present disclosure are concerned with solution velocities and commanded accelerations. Given that the planned velocities and accelerations are constant, the solution vector may be determined as follows:

$$x \begin{bmatrix} v^{LC} \\ a^{cmd} \end{bmatrix} = \begin{bmatrix} x^v_{0:N-1} \\ x^a_{0:M} \end{bmatrix}, \quad (4)$$

where the predicted velocity ($v^{LC}$) is a vector of velocities $x^v_{0:N-1}$ from 0 to N−1, where N is a number of velocity inputs for a horizon. Additionally, the commanded acceleration ($a^{cmd}$) is a vector of accelerations $x^a_{0:M}$ from 0 to M, where M is a number of acceleration inputs for the horizon. In one configuration, a vector of desired components (d) is determined as:

$$d = \begin{bmatrix} v^d \\ a^{dr} \end{bmatrix}. \quad (5)$$

To focus on solution velocities and commanded accelerations new quadratic and linear costs are as follows:

$$\arg \operatorname*{argmin}_x x^T Q x - 2d^T Q x, \quad (6)$$

where T is a transpose of a vector (e.g., a conversion of a vector to an array). The argmin function of EQUATION 6 outputs a minimization of the x vector of EQUATION 4.

When formulating the solution vector for the quadratic problem, consideration is given to the correspondences between solution velocities and planned velocities. The initial velocity of the vehicle is fixed and is not included in the solution vector. The planned velocity is produced by projecting the vehicle's current state into the previous plan. The nearest node to this projection serves as the start of the new plan. The planner then re-plans from the selected node. In this configuration, the initial planner velocity ($v_0^d$) corresponds to a same time step $t_0$ as the initial velocity $v^{init}$ provided to the quadratic problem.

The equality constraints of the quadratic problem define the relationships between decision variables:

$$x^a_0 = \frac{1}{\Delta_{t_0}} (x^v_0 - v_{init}) - \alpha_0 \quad (7)$$

$$x^a_i = \frac{1}{\Delta_{t_i}} (x^v_i - x^v_{i-1}) - \alpha_i; i = 1, \ldots, N, \quad (8)$$

where $\alpha_i$ is a feed-forward acceleration term resulting from drag and static friction forces. The inequality constraints maintain that jerk, acceleration, and velocity within appropriate bounds:

$$\pm \frac{1}{\Delta_{t_i}} (a^{LC}_i - a^{LC}_{i-1}) \leq j^{max}; i = 1, \ldots, N, \quad (9)$$

where $a^{min} \leq a^{cmd} \leq a^{max}$ and $v^{min} \leq v^{LC} \leq v^{max}$. The output variables may be extracted from the decision variables using the identities defined below and the acceleration model:

$$v^{LC}_0 = v^{init} \quad (10)$$

$$v^{LC}_i = x^v_{i-1}; i = 1, \ldots, N \quad (11)$$

$$a^{LC}_i = \frac{1}{\Delta_{t_i}} (v^{LC}_{i+1} - v^{LC}_i); i = 0, \ldots, N-1 \quad (12)$$

$$a^{cmd}_i = x^a_i; i = 0, \ldots, M-1 \quad (13)$$

$$a^{cmd}_i = \frac{1}{\Delta_{t_i}} (v^{LC}_{i+1} - v^{LC}_i) - \alpha_i; i = M, \ldots, N-1. \quad (14)$$

In the outputs discussed above, two separate terms are used for the acceleration. Specifically, the acceleration includes a commanded acceleration ($a^{cmd}$) and a predicted acceleration ($a^{LC}$). In an ideal environment, the command acceleration is the same as the predicted acceleration. However, non-linearity arises between the two values due to internal and external forces, such as engine structure, gearing, and drag forces. The actuator dynamics can be modeled as:

$$a^{LC} = \frac{1}{\beta_1} \left( \beta_2 - a^{LC} + \frac{1}{m} a^{cmd} + \beta_3 (v^{LC})^2 \right), \quad (15)$$

where m is the vehicle mass, $\beta_1$ is a time constant, $\beta_2$ is a static friction force (normalized to an acceleration by the vehicle mass), and $\beta_3$ is a drag coefficient (normalized to by the vehicle mass). The vehicle mass, a static friction force, and drag coefficient may be determined per vehicle, or per vehicle type. The actuator dynamics may be simplified to remove the time constant ($\beta_1$), yielding:

$$a^{LC}_i = a^{CMD}_i - \alpha_i \quad (16)$$

$$\alpha_i = -\beta_2 - \beta_3 (v^{LC}_i)^2, \quad (17)$$

where the drag terms may be calculated from pre-determined planner velocities, such that $v^{LC}_i = v^d_i$.

Figure 2A:
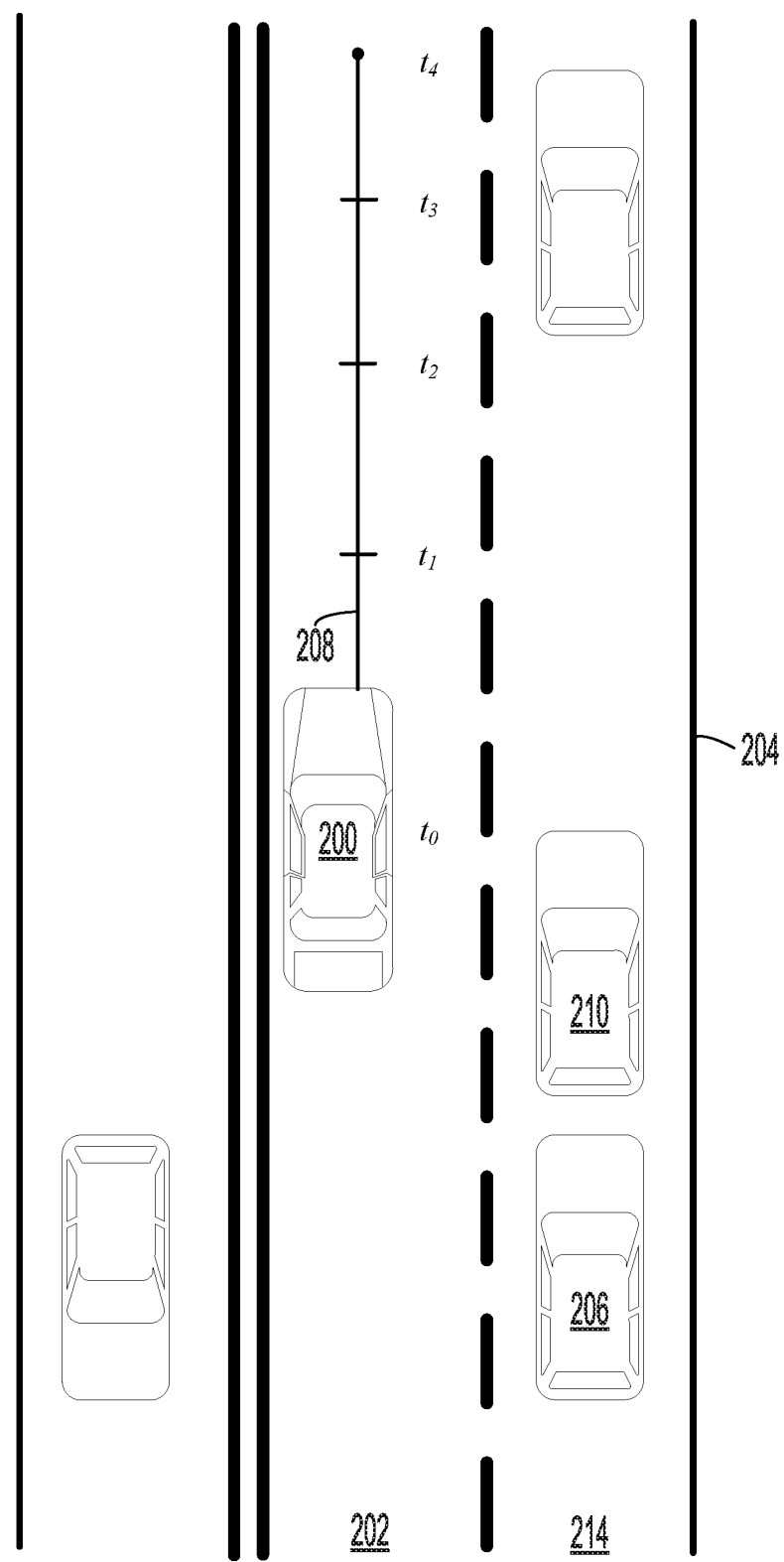
FIGS. 2A and 2B illustrate examples of implementing a driver-controlled model according to aspects of the present disclosure.

FIG. 2A illustrates an example of implementing a driver-controlled model according to aspects of the present disclosure. As shown in FIG. 2A, an ego vehicle 200 is traveling on a first lane 202 of a two-lane road 204. A first vehicle 206 and a second vehicle 210 are traveling on a second lane 214 of the two-lane road 204. In the example of FIG. 2A, a planner of the ego vehicle 200 has planned a trajectory 208 from the current time step.

The planned trajectory 208 includes N planned velocities ($v^d$), for a horizon. For example, the horizon may be from the current time step $t_0$ to an $N^{th}$ time step. For simplicity, in FIG. 2A, the $N^{th}$ time step is four, still, the $N^{th}$ time step is not limited to four. Additionally, the planner sets interval lengths ($\Delta_t$) between time steps (t). In this example, the planner will plan velocities $v_0^d$, $v_1^d$, $v_2^d$, $v_3^d$, and $v_4^d$, where each velocity corresponds to a different time step from time step 0 to 4 ($t_{0-4}$) (e.g., $v_1^d$ corresponds to time step 1 ($t_1$).

At time step $t_0$, the ego vehicle 200 has an initial velocity ($v^{init}$). The vehicle's 200 initial velocity is the vehicle's 200 true velocity at the given time step. The driver of the ego vehicle 200 may input an acceleration adjustment via an accelerator or a brake. The driver acceleration adjustment input would cause the vehicle's 200 current velocity to increase or decrease. After receiving the initial acceleration adjustment, a vector of driver accelerations ($a^{dr}$) may be generated. Where the initial term of the vector is the initial acceleration adjustment and the remaining terms are estimated via a zero-order hold or other methods.

Aspects of the present disclosure consider the planned velocities ($v^d$), and the driver accelerations ($a^{dr}$) to determine predicted velocities ($v^{LC}$) and a commanded accelerations ($a^{cmd}$) for the horizon. The predicted velocities ($v^{LC}$) are a vector of velocities $x_{0:N-1}^v$, where the velocity at time step 1 ($t_1$) corresponds to $x_0^v$. The commanded accelerations ($a_{cmd}$) are a vector of velocities $x_{0:M}^a$, where $x_0^a$ denotes the acceleration between $v^{init}$ and $x_0^v$.

The commanded acceleration ($a^{cmd}$) is constrained to be equal to or greater than a minimum acceleration ($a^{min}$) and equal to or less than a maximum acceleration ($a^{max}$). The predicted velocity ($v^{LC}$) is constrained to be equal to or greater than a minimum velocity ($v^{min}$) and equal to or less than a maximum velocity ($v^{max}$). The controller (e.g., autonomous vehicle system) may determine the commanded acceleration ($a_{cmd}$) and the predicted velocity ($v^{LC}$) a number of times (e.g., fifty, one-hundred, etc.) per second. The number of times may be pre-determined or dynamic.

As an example, the driver may command the vehicle 200 to accelerate. The autonomous vehicle system may determine that the acceleration would cause the vehicle 200 to exceed a maximum velocity ($v^{max}$). In response, the autonomous vehicle generates a commanded acceleration ($a^{cmd}$) to constrain the predicted velocity ($v^{LC}$) to be less than or equal to the maximum velocity ($v^{max}$). The vehicle 200 will proceed with the commanded accelerations ($a^{cmd}$) and the predicted velocities ($v^{LC}$) over the determined horizon (e.g., time step 0-N).

As an example, the driver may command the vehicle 200 to decelerate. The autonomous vehicle system may determine that the difference between predicted acceleration from a current time step (i) and a previous time step (i-1) (e.g., ($a_i^{LC} - a_{i-1}^{LC}$)) would be greater than the maximum jerk ($j^{max}$). Therefore, the autonomous vehicle system would adjust the predicted acceleration (e.g., deceleration), such that ($a_i^{LC} - a_{i-1}^{LC}$) would be less than or equal to the maximum jerk ($j^{max}$).

Figure 2B:
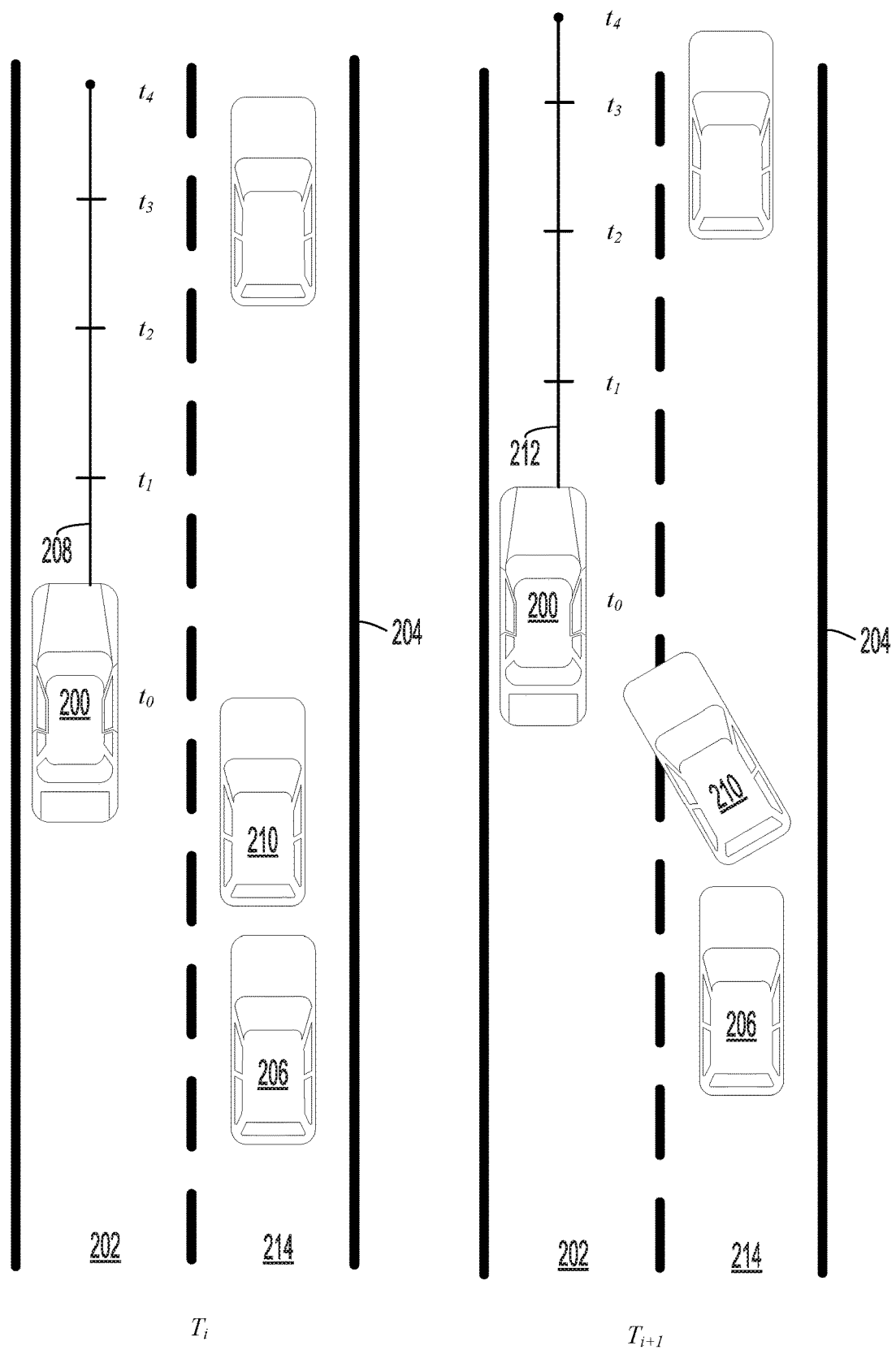

FIG. 2B illustrates an example of implementing a driver-controlled model according to aspects of the present disclosure. As shown in FIG. 2B, the ego vehicle 200 is traveling on the first lane 202 of the two-lane road 204. The first vehicle 206 and a second vehicle 210 are traveling on a second lane 214 of the two-lane road 204.

In the example of FIG. 2B, at a current time ($T_i$) the planner of the ego vehicle 200 has planned a trajectory 208 from an initial time step ($t_0$) corresponding to the current time ($T_i$). In FIG. 2B, the planned trajectory 208 includes N planned velocities ($v^d$), for a horizon. For example, the horizon may be from the current time step $t_0$ to an $N^{th}$ time step. As discussed above, based on planned velocities ($v^d$) and the driver accelerations ($a^{dr}$), the vehicle 200 may determine predicted velocities ($v^{LC}$) and a commanded accelerations ($a_{cmd}$) for the horizon ($t_{0-4}$).

After planning the trajectory 208 (e.g., predicted velocity ($v^{LC}$) and a commanded acceleration ($a_{cmd}$) for the horizon ($t_{0-4}$)), the autonomous vehicle system may re-evaluate the planned trajectory at an interval, such as once every 20 MS. The planned trajectory 208 may be updated based on environmental factors, such as a position of other vehicles 206, 210 or hazards on the road 204, or other factors.

In FIG. 2B, while re-evaluating the planned trajectory 208, the ego vehicle 200 determines that the second vehicle 210 is veering towards the ego vehicle 200. The ego vehicle 200 may use one or more sensors, such as an RGB camera, RADA, or LIDAR, to determine the location of the second vehicle 210. In response to detecting the veering second vehicle 210, the planner may generate an updated trajectory 212 to avoid a potential collision.

The updated trajectory 212 may increase values of the minimum acceleration ($a^{min}$), the maximum acceleration ($a^{max}$), the minimum velocity ($v^{min}$), and the maximum velocity ($v^{max}$) in comparison to the values for the previous trajectory 208. The updated trajectory 212 may also increase the values of the planned velocities ($v^d$) in comparison to the values of the planned velocities ($v^d$) for the previous trajectory 208. Additionally, the driver may fail to notice the veering second vehicle 210 and may not response via an acceleration/deceleration input. That is, the driver accelerations ($a^{dr}$) may not be adjusted.

Nonetheless, even if the driver accelerations ($a^{dr}$) are not adjusted, the increased values for the planned velocities ($v^d$), the minimum acceleration ($a^{min}$), the maximum acceleration ($a^{max}$), the minimum velocity ($v^{min}$), and/or the maximum velocity ($v^{max}$) cause the planner to generate new predicted velocities ($v^{LC}$) and new commanded accelerations ($a^{cmd}$) for the horizon ($t_{0-4}$). Accordingly, the ego vehicle 200 will accelerate to the new predicted velocity ($x_0^v$) at the step 1 ($t_1$) to avoid a collision with the veering vehicle. Aspects of the present disclosure are not limited to increasing acceleration or velocity to avoid a collision. Other adjustments, such as a decrease to velocity and/or acceleration, may be performed to avoid a collision.

Figure 3:
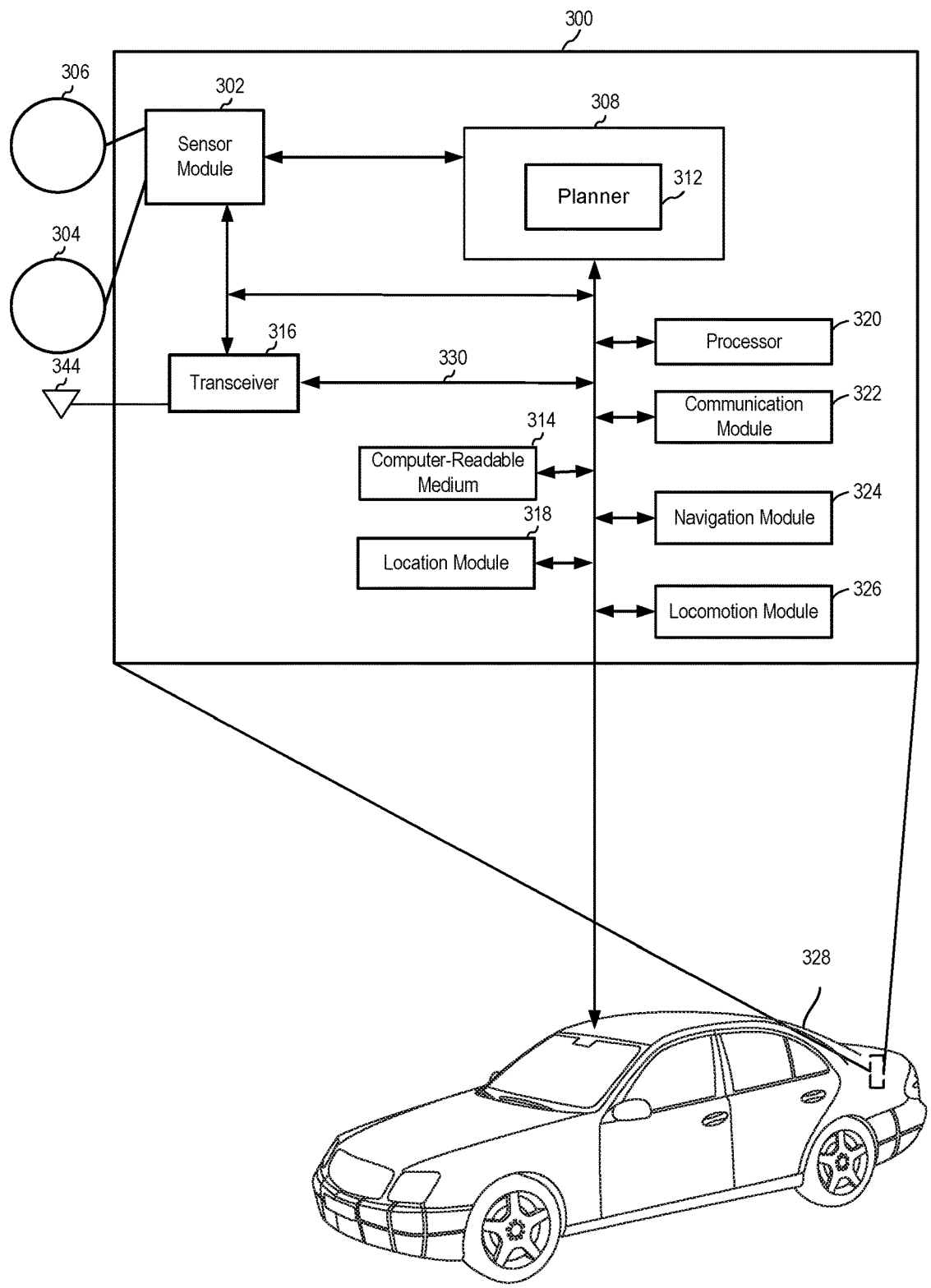
FIG. 3 is a diagram illustrating an example of a hardware implementation for a driver-centric controller system according to aspects of the present disclosure.

FIG. 3 is a diagram illustrating an example of a hardware implementation for a driver-centric controller system 300, according to aspects of the present disclosure. The driver-centric controller system 300 may be a component of a vehicle, a robotic device, or another device. For example, as shown in FIG. 3, the driver-centric controller system 300 is a component of a vehicle 328. Aspects of the present disclosure are not limited to the vehicle 328, as other devices, such as a bus, boat, drone, or robot, are also contemplated for using the driver-centric controller system 300.

The driver-centric controller system 300 may be implemented with a bus architecture, represented generally by a bus 330. The bus 330 may include any number of interconnecting buses and bridges depending on the specific application of the driver-centric controller system 300 and the overall design constraints. The bus 330 links together various circuits including one or more processors and/or hardware modules, represented by a processor 320, a communication module 322, a location module 318, a sensor module 302, a locomotion module 326, a navigation module 324, a computer-readable medium 314, and a driver-centric controller module 308. The bus 330 may also link various other circuits such as timing sources, peripherals, voltage regulators, and power management circuits, which are well known in the art, and therefore, will not be described any further.

The driver-centric controller system 300 includes a transceiver 316 coupled to the processor 320, the sensor module 302, the driver-centric controller module 308, the communication module 322, the location module 318, the locomotion module 326, the navigation module 324, and the computer-readable medium 314. The transceiver 316 is coupled to an antenna 344. The transceiver 316 communicates with various other devices over a transmission medium.

The driver-centric controller system 300 includes the processor 320 coupled to the computer-readable medium 314. The processor 320 performs processing, including the execution of software stored on the computer-readable medium 314 providing functionality according to the disclosure. The software, when executed by the processor 320, causes the driver-centric controller system 300 to perform the various functions described for a particular device, such as the vehicle 328, or any of the modules 302, 308, 312, 314, 316, 318, 320, 322, 324, 326. The computer-readable medium 314 may also be used for storing data that is manipulated by the processor 320 when executing the software.

The sensor module 302 may be used to obtain measurements via different sensors, such as a first sensor 306 and a second sensor 304. The first sensor 306 may be a vision sensor, such as a stereoscopic camera or a red-green-blue (RGB) camera, for capturing 2D images. The second sensor 304 may be a ranging sensor, such as a light detection and ranging (LIDAR) sensor or a radio detection and ranging (RADAR) sensor. Of course, aspects of the present disclosure are not limited to the aforementioned sensors as other types of sensors, such as, for example, thermal, sonar, and/or lasers are also contemplated for either of the sensors 304, 306.

The measurements of the first sensor 306 and the second sensor 304 may be processed by one or more of the processor 320, the sensor module 302, the communication module 322, the location module 318, driver-centric controller module 308, the locomotion module 326, and the navigation module 324, in conjunction with the computer-readable medium 314, to implement the functionality described herein. In one configuration, the data captured by the first sensor 306 and the second sensor 304 may be transmitted to an external device via the transceiver 316. The first sensor 306 and the second sensor 304 may be coupled to the vehicle 328 or may be in communication with the vehicle 328.

The location module 318 may be used to determine a location of the vehicle 328. For example, the location module 318 may use a global positioning system (GPS) to determine the location of the vehicle 328. The communication module 322 may be used to facilitate communications via the transceiver 316. For example, the communication module 322 may be configured to provide communication capabilities via different wireless protocols, such as WiFi, long term evolution (LTE), 4G, etc. The communication module 322 may also be used to communicate with other components of the vehicle 328 that are not modules of the driver-centric controller system 300.

The locomotion module 326 may be used to facilitate locomotion of the vehicle 328. As an example, the locomotion module 326 may control the movement of the wheels. As another example, the locomotion module 326 may be in communication with a power source of the vehicle 328, such as an engine or batteries. Of course, aspects of the present disclosure are not limited to providing locomotion via wheels and are contemplated for other types of components for providing locomotion, such as propellers, treads, fins, and/or jet engines.

The driver-centric controller system 300 also includes the navigation module 324 for planning a route or controlling the locomotion of the vehicle 328, via the locomotion module 326. The navigation module 324 may be in communication with the driver-centric controller module 308, the sensor module 302, the transceiver 316, the processor 320, the communication module 322, the location module 318, the locomotion module 326, the navigation module 324, and the computer-readable medium 314. In one configuration, the navigation module 324 overrides the user input. The modules may be software modules running in the processor 320, resident/stored in the computer-readable medium 314, one or more hardware modules coupled to the processor 320, or some combination thereof.

According to aspects of the present disclosure, the driver-centric controller system 300 includes a driver-centric controller module 308 in communication with the navigation module 324, the sensor module 302, the transceiver 316, the processor 320, the communication module 322, the location module 318, the locomotion module 326, the navigation module 324, and the computer-readable medium 314.

In one configuration, the driver-centric controller module 308 includes a planner 312 for planning a trajectory on a route. The route may be determined by the navigation module 324. The planner 312 may determine N planned velocities ($v^d$), for a horizon. For example, the horizon may be from the current time step $t_0$ to an $N^{th}$ time step. The planner 312 may also determine the minimum acceleration ($a^{min}$), the maximum acceleration ($a^{max}$), the minimum velocity ($v^{min}$), the maximum velocity ($v^{max}$), and interval lengths ($\Delta_t$). Additionally, the planner may adjust one or more parameters based on information received from a sensor module 302, transceiver 316, communication module 322, navigation module 324, location module 318, or locomotion module 326.

The driver-centric controller module 308 also receives driver inputs via acceleration and deceleration inputs (e.g., accelerator and brake). The driver-centric controller module 308 may obtain an initial acceleration adjustment from the driver's input. Additionally, remaining terms are estimated via a zero-order hold or other methods. The initial acceleration adjustment (e.g., initial command) and the remaining terms populate the vector of driver inputs ($a^{dr}$).

Based on the driver inputs ($a^{dr}$), the planned velocities ($v^d$), and other parameters discussed herein, the driver-centric controller module 308 determines an predicted velocity ($v^{LC}$) and an acceleration command ($a^{CMD}$) based on the function of EQUATION 6. The predicted velocity ($v^{LC}$) and an acceleration command ($a^{CMD}$) may be used to control the vehicle 328 via the locomotion module 326 and/or the navigation module 324.

Figure 4:
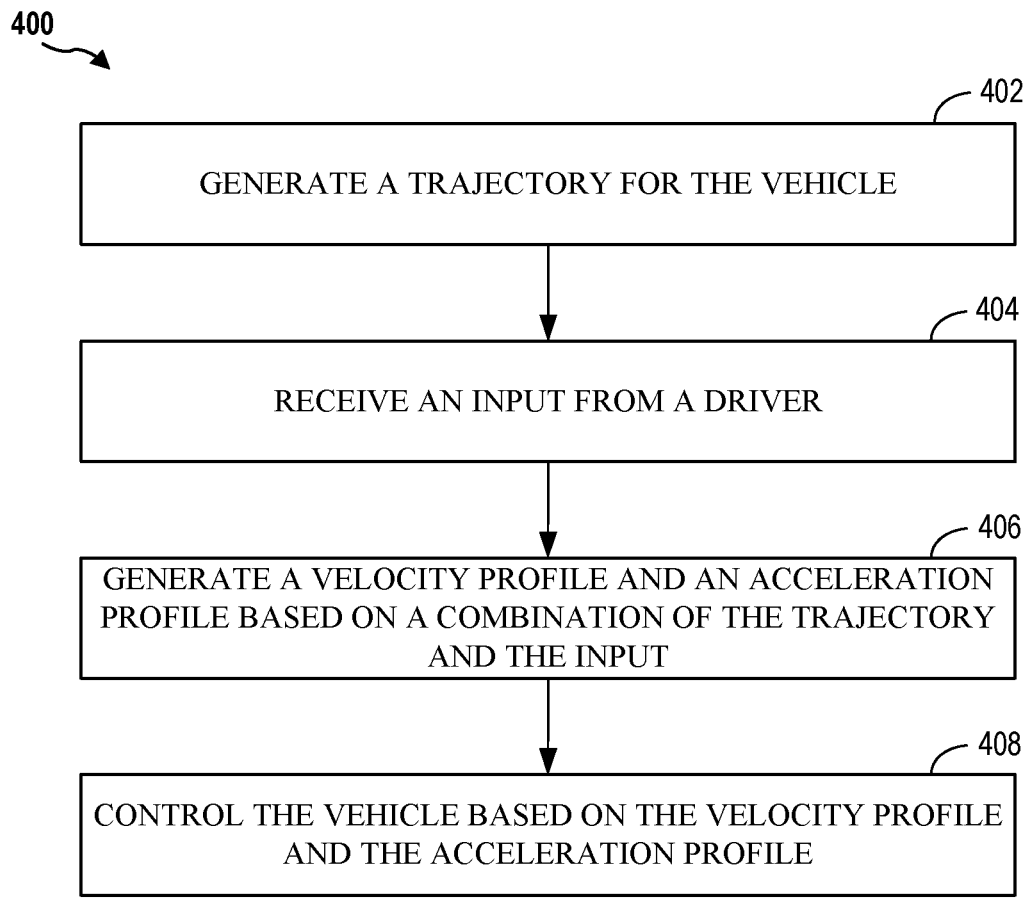
FIG. 4 illustrates a flow diagram for controlling a vehicle based on a driver-centric model according to aspects of the present disclosure.

FIG. 4 illustrates a method 400 for controlling a vehicle based on a driver-centric model according to an aspect of the present disclosure. As shown in FIG. 4, at block 402, a driver-centric controller generates a trajectory for the vehicle. The trajectory includes a vector of velocities for a period of time, a minimum acceleration, a maximum acceleration, a minimum velocity, a maximum velocity, and a length of time for each time step. The length of time for each time step may also be a length of time between adjacent velocities of the vector.

At block 404, the driver-centric controller receives an input from a driver. The input may be an acceleration input (e.g., an input from an acceleration pedal) or a deceleration input (e.g., an input from a brake pedal). In one configuration, the driver-centric controller generates a vector of driver inputs via a signal reconstruction of the input from the driver.

At block 406, the driver-centric controller generates a velocity profile and an acceleration profile based on a combination of the trajectory and the input. The acceleration profile includes a vector of accelerations and the velocity profile comprises a vector of velocities. The velocity profile and the acceleration profile are generated based on a function of the vector of driver inputs, the vector of velocities, the minimum acceleration, the maximum acceleration, the minimum velocity, the maximum velocity, and the length of time for each time step.

At block 408, the driver-centric controller generates controls the vehicle based on the velocity profile and the acceleration profile. For example, the driver-centric controller may cause the vehicle to accelerate or decelerate. In one configuration, the driver-centric controller controls an acceleration of the vehicle from an initial velocity to a first velocity in the vector of velocities based on a first acceleration in the vector of accelerations.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor configured to perform the functions discussed in the present disclosure. The processor may be a neural network processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functions described throughout this present disclosure. Those skilled in the art will recognize how best to implement the described functionality for the processing system depending on the particular application and the overall design constraints imposed on the overall system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for controlling a first vehicle based on a driver-centric model, comprising:
    generating an acceleration profile based on receiving an input from a driver to adjust a velocity of the first vehicle, the input received while the driver is operating the first vehicle, the acceleration profile comprising a vector of accelerations, each acceleration of the vector of accelerations constrained based on a minimum acceleration, a maximum acceleration, and a maximum velocity of a the first trajectory of the first vehicle, such that each acceleration of the vector of accelerations does not cause the velocity to exceed the maximum velocity;

controlling the first vehicle based on a first velocity profile and the acceleration profile, the first velocity profile being generated based on the acceleration profile and the first trajectory of the first vehicle;

generating an adjusted acceleration profile based on determining, via one or more sensors of the first vehicle, that a second vehicle is approaching the first vehicle, generating the adjusted acceleration profile comprising adjusting one or more of the minimum acceleration, the maximum acceleration, and the maximum velocity of each acceleration of the vector of accelerations; and controlling the first vehicle based on a second velocity profile and the adjusted acceleration profile, the second velocity profile being generated based on the adjusted acceleration profile and a second trajectory of the first vehicle, the second trajectory being generated based on a distance between the first vehicle and the second vehicle.

2. The method of claim 1, further comprising generating a vector of driver inputs via a signal reconstruction of the input from the driver.

3. The method of claim 2, in which the first trajectory comprises a vector of velocities for a period of time, the minimum acceleration, the maximum acceleration, a minimum velocity, the maximum velocity, and a length of time between adjacent velocities of the vector of velocities.

4. The method of claim 3, in which the first velocity profile is generated based on a function of at least the vector of accelerations, the minimum velocity, the maximum velocity, and the length of time.

5. The method of claim 1, the input is received via an acceleration input device or a deceleration input device.

6. The method of claim 1, in which the first velocity profile comprises a vector of velocities.

7. The method of claim 6, in which controlling the first vehicle based on the first velocity profile comprises adjusting the velocity from an initial velocity in the vector of velocities to a first velocity in the vector of velocities based on a first acceleration in the vector of accelerations.

8. An apparatus for controlling a first vehicle based on a driver-centric model, the apparatus comprising:
a memory; and
at least one processor coupled to the memory, the at least one processor configured:
to generate an acceleration profile based on receiving an input from a driver to adjust a velocity of the first vehicle, the input received while the driver is operating the first vehicle, the acceleration profile comprising a vector of accelerations, each acceleration of the vector of accelerations constrained based on a minimum acceleration, a maximum acceleration, and a maximum velocity of a the first trajectory of the first vehicle, such that each acceleration of the vector of accelerations does not cause the velocity to exceed the maximum velocity;
to control the first vehicle based on a first velocity profile and the acceleration profile, the first velocity profile being generated based on the acceleration profile and the first trajectory of the first vehicle;
to generate an adjusted acceleration profile based on determining, via one or more sensors of the first vehicle, that a second vehicle is approaching the first vehicle,
the at least one processor configured to generate the adjusted acceleration profile by adjusting one or more of the minimum acceleration, the maximum acceleration, and the maximum velocity of each acceleration of the vector of accelerations; and
to control the first vehicle based on a second velocity profile and the adjusted acceleration profile, the second velocity profile being generated based on the adjusted acceleration profile and a second trajectory of the first vehicle, the second trajectory being generated based on a distance between the first vehicle and the second vehicle.

9. The apparatus of claim 8, in which at least one processor is further configured to generate a vector of driver inputs via a signal reconstruction of the input from the driver.

10. The apparatus of claim 9, in which the first trajectory comprises a vector of velocities for a period of time, the minimum acceleration, the maximum acceleration, a minimum velocity, the maximum velocity, and a length of time between adjacent velocities of the vector of velocities.

11. The apparatus of claim 10, in which the first velocity profile is generated based on a function of at least the vector of accelerations, the minimum velocity, the maximum velocity, and the length of time.

12. The apparatus of claim 8, in which the input is received via an acceleration input device or a deceleration input device.

13. The apparatus of claim 8, in which the first velocity profile comprises a vector of velocities.

14. The apparatus of claim 13, in which at least one processor is further configured to control the first vehicle based on the first velocity profile by adjusting the velocity from an initial velocity in the vector of velocities to a first velocity in the vector of velocities based on a first acceleration in the vector of accelerations.

15. A non-transitory computer-readable medium having program code recorded thereon for controlling a first vehicle based on a driver-centric model, the program code executed by a processor and comprising:
program code to generate an acceleration profile based on receiving an input from a driver to adjust a velocity of the first vehicle, the input received while the driver is operating the first vehicle, the acceleration profile comprising a vector of accelerations, each acceleration of the vector of accelerations constrained based on a minimum acceleration, a maximum acceleration, and a maximum velocity of a the first trajectory of the first vehicle, such that each acceleration of the vector of accelerations does not cause the velocity to exceed the maximum velocity;
program code to control the first vehicle based on a first velocity profile and the acceleration profile, the first velocity profile being generated based on the acceleration profile and the first trajectory of the first vehicle;
program code to generate an adjusted acceleration profile based on determining, via one or more sensors of the first vehicle, that a second vehicle is approaching the first vehicle,
the program code to generate the adjusted acceleration profile comprising program code to adjust one or more of the minimum acceleration, the maximum acceleration, and the maximum velocity of each acceleration of the vector of accelerations; and program code to control the first vehicle based on a second velocity profile and the adjusted acceleration profile, the second velocity profile being generated based on the adjusted acceleration profile and a second trajectory of the first vehicle, the second trajectory being generated based on a distance between the first vehicle and the second vehicle.

16. The non-transitory computer-readable medium of claim 15, in which the program code further comprises program code to generate a vector of driver inputs via a signal reconstruction of the input from the driver.

17. The non-transitory computer-readable medium of claim 16, in which the first trajectory comprises a vector of velocities for a period of time, the minimum acceleration, the maximum acceleration, a minimum velocity, the maximum velocity, and a length of time between adjacent velocities of the vector of velocities.

18. The non-transitory computer-readable medium of claim 17, in which the first velocity profile is generated based on a function of at least the vector of accelerations, the minimum velocity, the maximum velocity, and the length of time.

19. The non-transitory computer-readable medium of claim 15, in which the input is received via an acceleration input device or a deceleration input device.

20. The non-transitory computer-readable medium of claim 15, in which the first velocity profile comprises a vector of velocities.

* * * * *